Inventor
Henry H. Talboys
by Parker & Carter
Attorneys

March 4, 1958 H. H. TALBOYS 2,825,372
TIE DRILL
Filed March 30, 1954 10 Sheets-Sheet 3

Inventor
Henry H. Talboys
by Parker & Carter
Attorneys

March 4, 1958     H. H. TALBOYS     2,825,372
TIE DRILL

Filed March 30, 1954     10 Sheets-Sheet 5

Inventor
Henry H. Talboys
by Parker & Carter
Attorneys

March 4, 1958 H. H. TALBOYS 2,825,372
TIE DRILL
Filed March 30, 1954 10 Sheets-Sheet 6
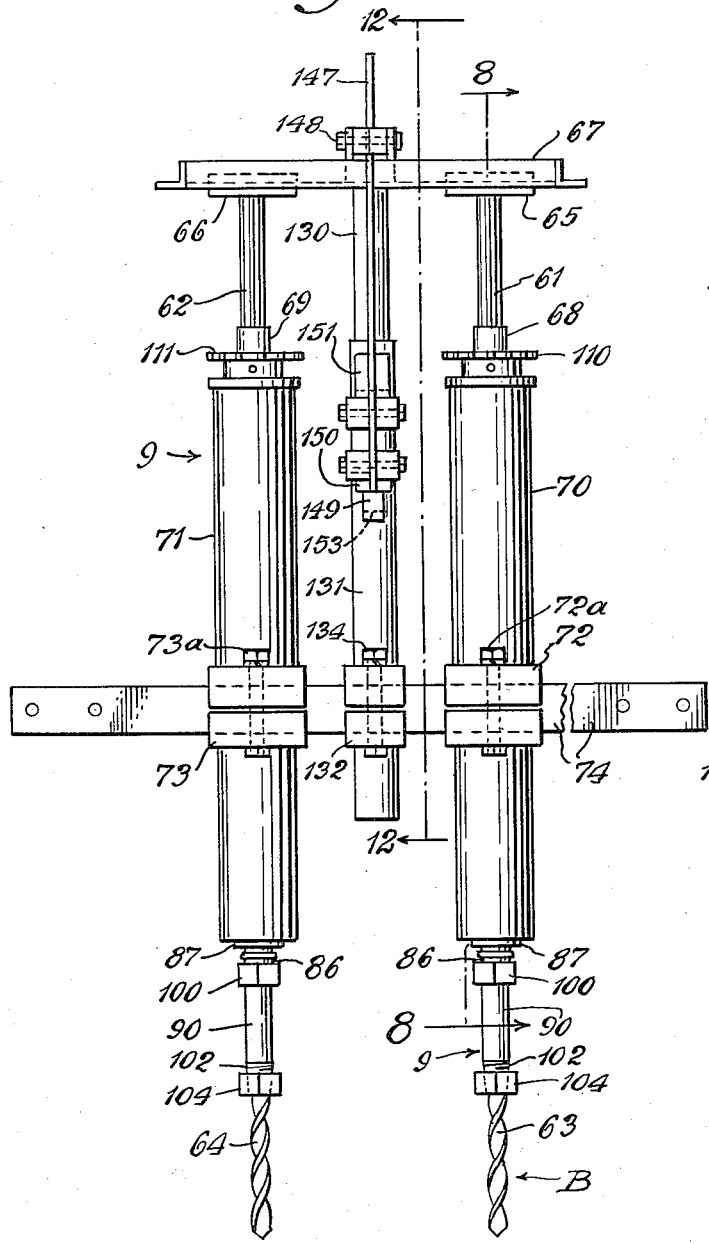
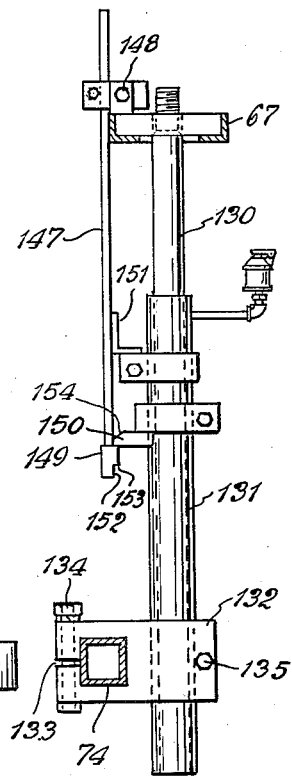
Inventor
Henry H. Talboys
by Parker & Carter
Attorneys March 4, 1958     H. H. TALBOYS     2,825,372
TIE DRILL Filed March 30, 1954     10 Sheets-Sheet 7

Inventor
Henry H. Talboys
by Parker & Carter
Attorneys

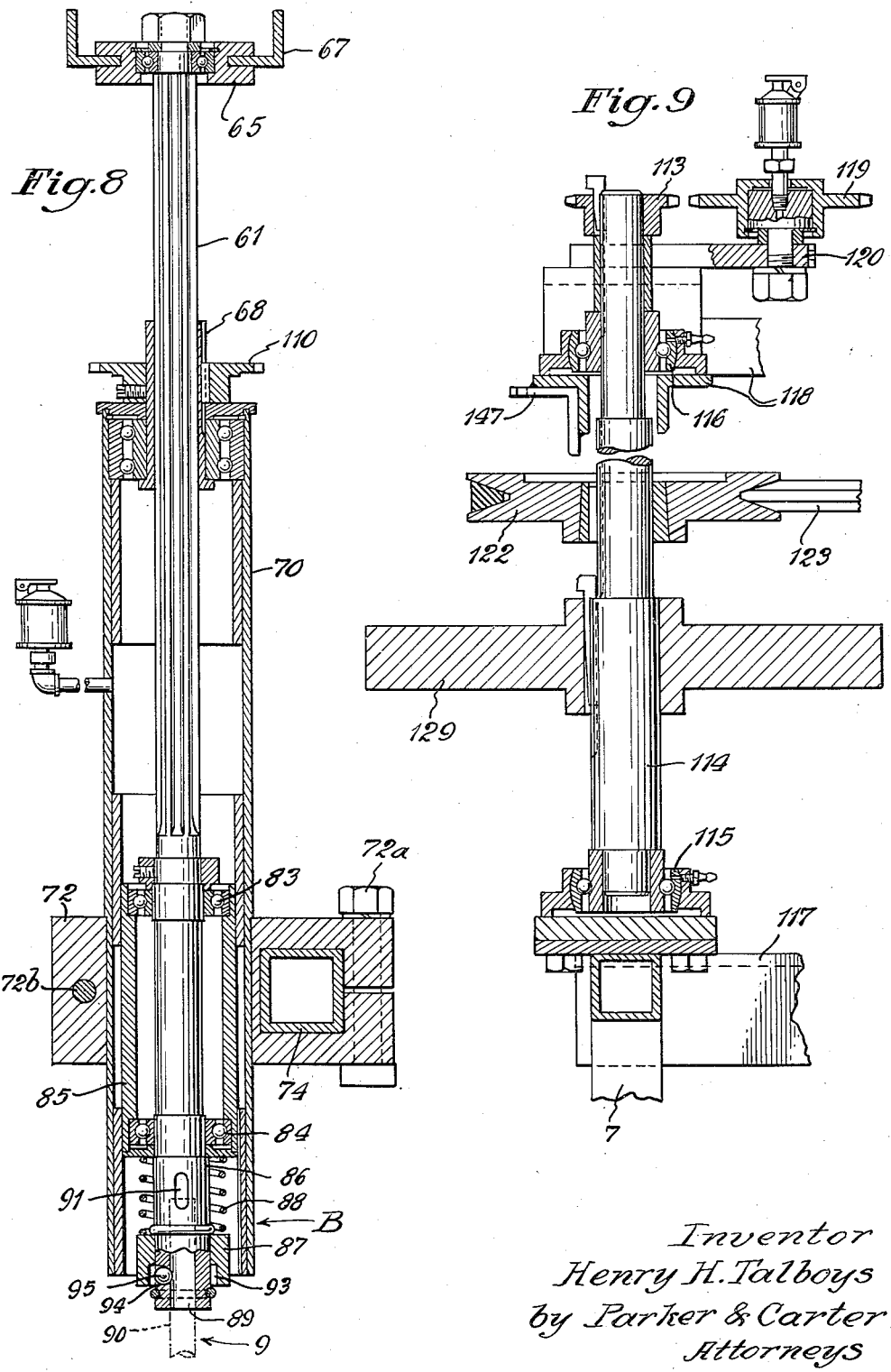

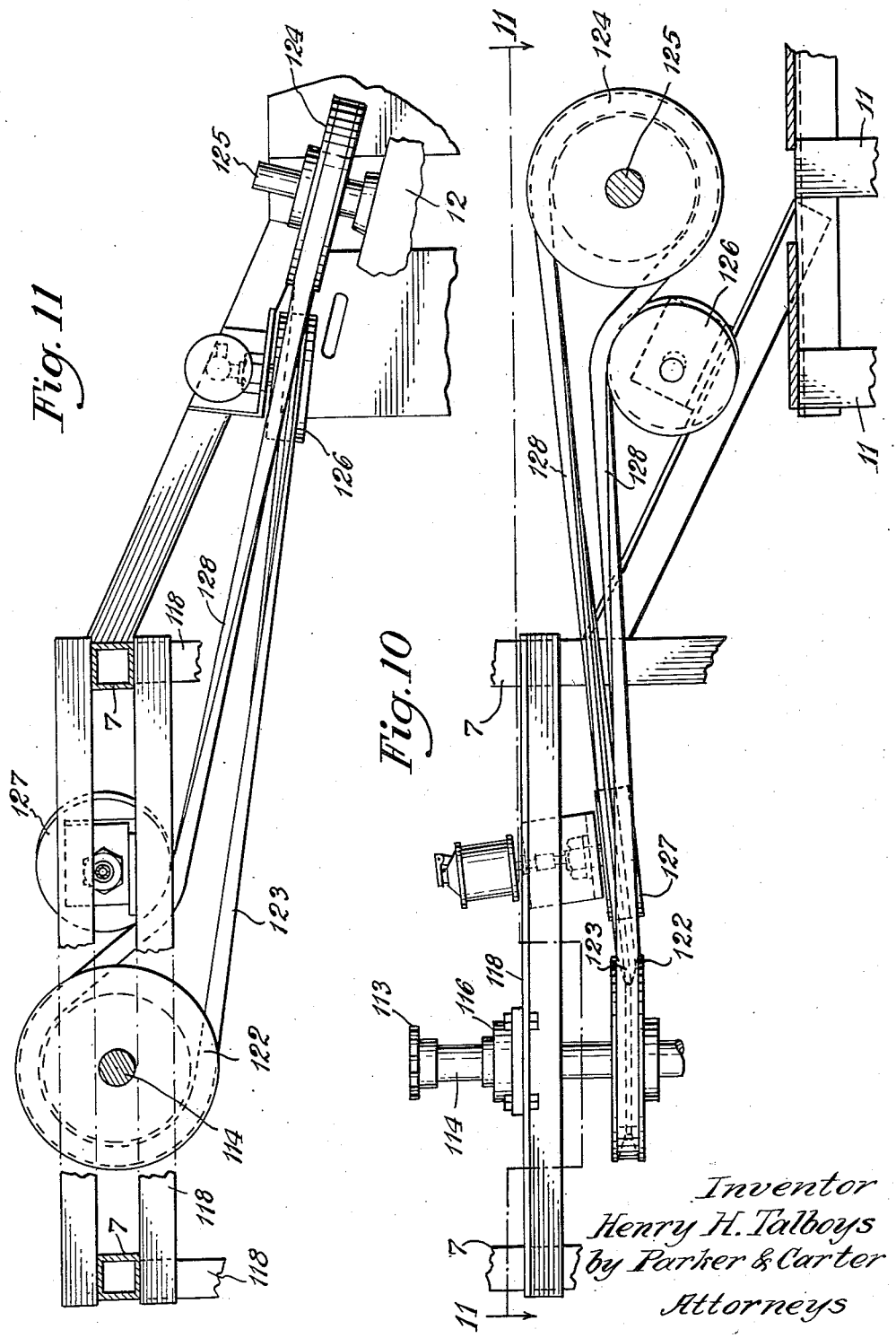

March 4, 1958
H. H. TALBOYS
2,825,372
TIE DRILL
Filed March 30, 1954
10 Sheets-Sheet 10
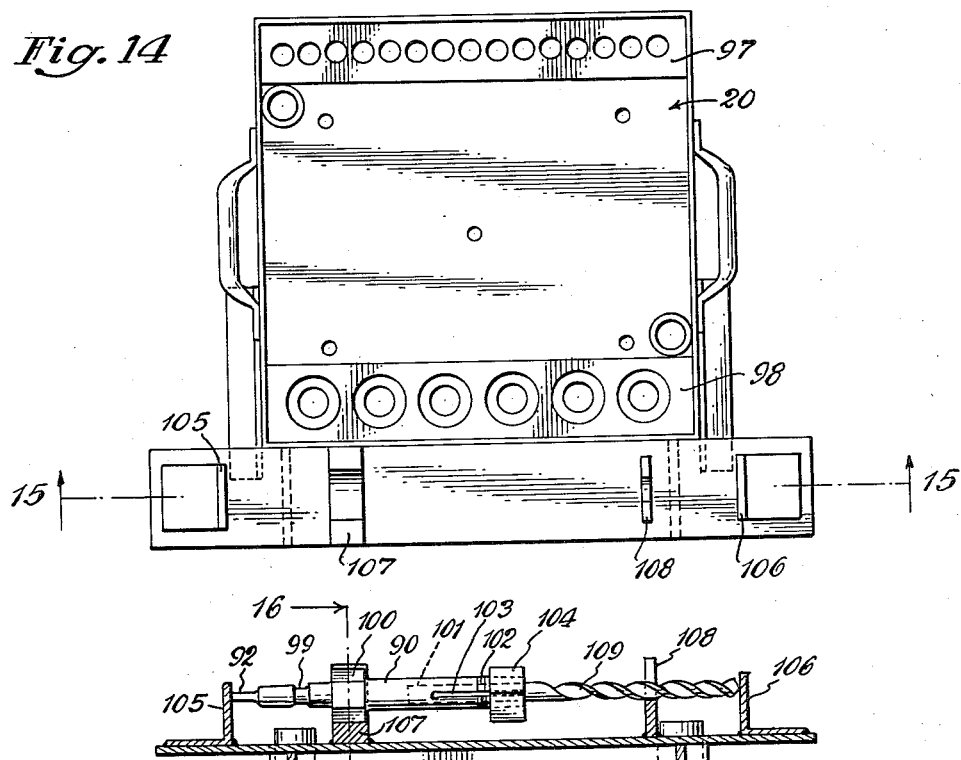
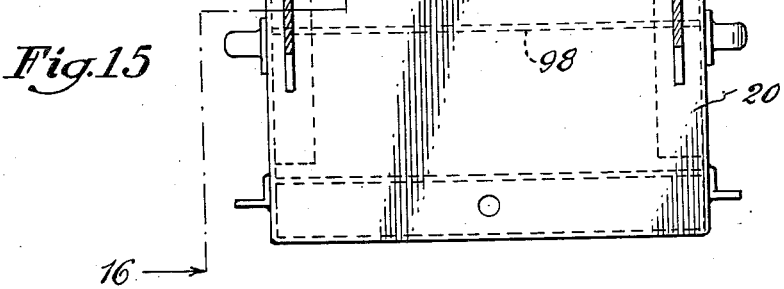
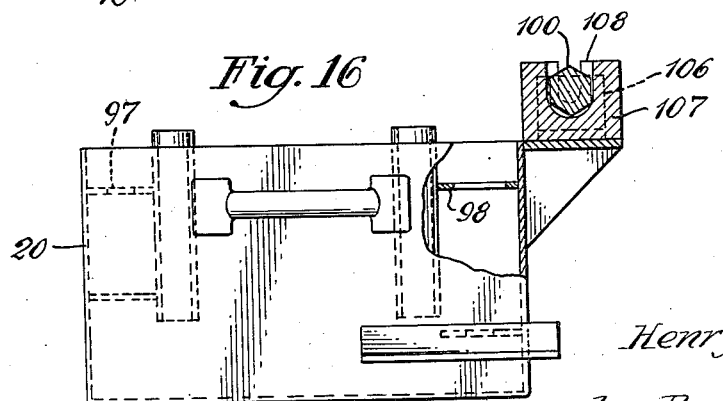
Inventor
Henry H. Talboys
by Parker & Carter
Attorneys

United States Patent Office 2,825,372
Patented Mar. 4, 1958

2,825,372

TIE DRILL

Henry H. Talboys, Milwaukee, Wis., assignor to Nordberg Manufacturing Company, Milwaukee, Wis., a corporation of Wisconsin Application March 30, 1954, Serial No. 419,803

9 Claims. (Cl. 144—92)

This invention is directed to a new and improved method and apparatus for drilling spike holes in the supporting ties for the rails of a track.

One purpose of the present invention is to simplify and facilitate the drilling of spike holes in the supporting ties of a track, thus enhancing the rail laying operation.

Another purpose of the present invention is the provision of an improved tie drilling apparatus wherein means are provided for insuring that the spike holes drilled into the ties are perpendicular to the plane of the ties or the plane of the rails, thus avoiding any "crowding" or "camming" of the rail out of its gauged position when spikes are subsequently driven into the holes in the ties.

Another purpose of the present invention is the provision of an improved apparatus and system for aligning a plurality of drilled spike holes laterally of the rail by relating the position of the drills to the gauge side of said rail.

Another purpose is to provide a tie drill adjustable or adapted to fit the drill bits into the spike holes in a tie plate.

Another purpose is to provide improved means for controlling or setting the depth to which holes will be drilled in the supporting ties.

Another purpose is to provide a tie drill in which with a plurality of drills, the operator need sight and spot only one drill longitudinally of the track, the other drill or drills being thereby spotted automatically in longitudinal and lateral relation to the tie plates for which holes are drilled.

Another purpose is to provide improved set-off means for tie drills and similar trackworking machines.

Another purpose is to provide improved driving means for tie drills.

Another purpose of the present invention is to provide a supporting mechanism for a plurality of tie drill bits which allows both axial adjustment of the drills with relation to a point on the track and both individual and collective lateral adjustment of the drills with respect to said point on the track.

Another object is to provide improved driving means for positioning a plurality of tie drills along the rails of a track to thereby facilitate longitudinal positioning of the tie drills with relation to a track rail.

Another object is to provide improved means for assembling a tie drill bit and drill chuck to thereby facilitate a quick replacement of drilled bits.

Other purposes will appear from time to time in the course of the ensuing specification and claims.

The invention is illustrated more or less diagrammatically in the attached drawings wherein:

Figure 6 is a detail view of a portion of the drilling assembly shown in Figures 1, 2 and 3;

Figure 8 is a detail view in section of the drilling assembly shown in Figure 6, taken along the section line 8—8 of Figure 6;

Figure 9 is a detail view, with certain portions shown in section for purposes of clarity, of a portion of the transmission for the drilling assembly;

Figure 10 is a detail view of another portion of the transmission for the drilling assembly;

Figure 11 is a sectional view of the portion of the transmission taken along the line 11—11 of Figure 10;

Figure 12 is a detail view of a mechanism for controlling the height of the drilling assembly taken along the section lines 12—12 of Figure 6;

Figure 14 is a plan view of the tool box shown in Figure 1 and Figure 3;

Figure 15 is a sectional view of the device shown in Figure 14 taken along the section line 15—15 of Figure 14; and Figure 16 is a sectional view of the device shown in Figure 15 looking along the section lines 16—16 of Figure 15.

Figure 1:
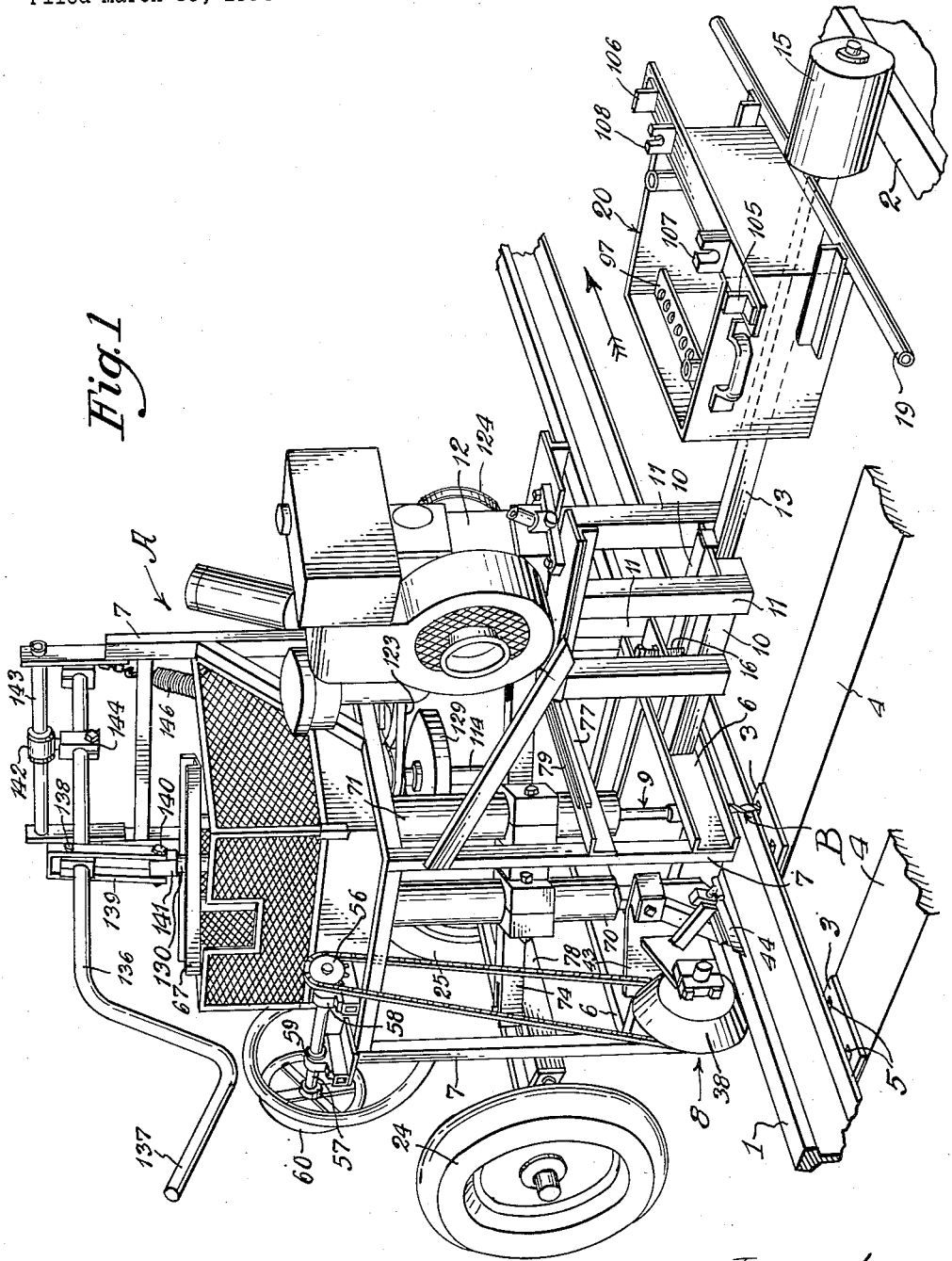
Figure 1 is a perspective view of the improved drilling machine of the present invention.
Figure 2:
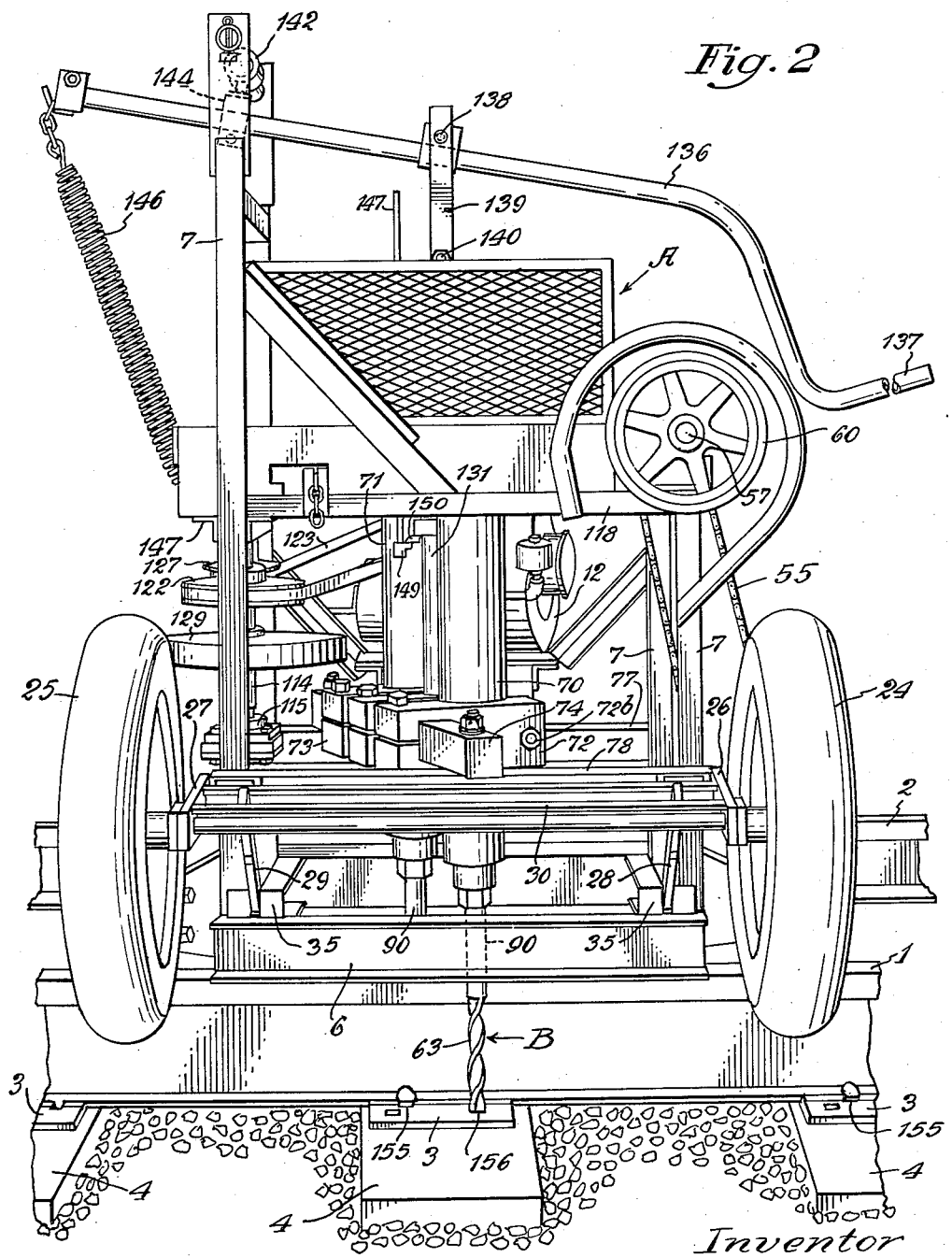
Figure 2 is a side elevational view looking transversely of the track rails supporting the machine shown in Figure 1.

Referring specifically now to the drawings wherein like elements are designated by like characters throughout and in the first instance to Figure 1, 1 and 2 represent the two rails of a railroad track. The rail 2 is shown as a normally fixed rail, whereas the rail 1 is seated upon tie plates 3 which, in turn, are supported on the usual ties 4. The tie plates 3 have the customary holes 5 formed therein for the reception of the rail spikes.

Figure 13:
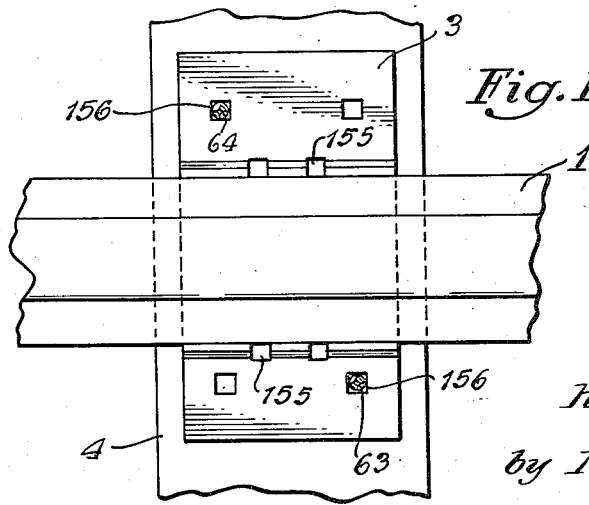
Figure 13 is a plan view of a typical tie plate, tie and rail assembly.

According to my method, the tie plates 3 are positioned to the proper gauge by any suitable gauging device. They may be initially secured in their gauged position by means of small wooden pegs or the like driven into the ties through the tie plates. After the tie plates have been properly positioned, the rail 1 is positioned in the rail seats of the tie plates. A tie drilling machine, indicated diagrammatically at A, is supported for the most part upon the rail 1. The tie drilling machine includes a pair of spaced drills represented diagrammatically at B. The drilling assembly preferably includes a pair of spaced tie drills adapted to straddle the rail 1 which is positioned at the proper gauge from rail 2. In my method of drilling the spike holes, I pre-select the desired lateral position of the drilling assembly with relation to the rail 1. Any adjustments necessary for the correct positioning of the tie drills are made in the machine prior to the drilling operation. The tie drills are initially spaced and adjusted so as to conform to the spacing of the spike receiving holes in the tie plates 3, as will be seen in Figure 13. The drilling assembly is also adjusted to insure reciprocation of the drilling assembly in a direction normal to the plane of the ties prior to the actual drilling operation. After the drills are placed in their selected lateral position and their necessary normal position, the machine is moved along the rails. The machine is stopped at each tie for successive drilling operations. The operator of the machine sights along the rail 1 and spots one of the drills in its correct longitudinal position over one of the holes in the tie plates. After spotting or aligning one of the drills in the proper longitudinal position, the drilling assembly is reciprocated to drill the spike holes. Due to my method, it is unnecessary to spot the lateral position of the drilling assembly and it is unnecessary to spot or align more than one drill longitudinally of the rail 1. This method is faster than previous methods, requires less operator skill and insures greater uniformity and accuracy in the position of the spike holes.

Other features of the method will become manifest from the description of the machine which follows.

As shown in Figure 1, a frame, including generally horizontal and longitudinally extending members 6 and generally upright frame members 7, is supported by roller assemblies 8 at the front and rear of the machine and in supporting engagement with the rail 1. The frame serves to support a drilling assembly indicated generally at 9. The frame includes transversely extending members 10, which extend toward the normally fixed rail 2. Fixed to the members 10 and upstanding therefrom are a plurality of members 11 serving to support a prime mover 12 which, in this instance, is shown as an internal combustion engine. A stabilizing bar 13 is pivoted intermediate its ends to the frame members 10 as at 14 and carries a roller 15 at its outer end adapted to be supported upon the normally fixed rail 2. The frame is adapted to be propelled in the direction of the arrow shown in Figure 1.

An adjusting member in the form of a bolt 16 is carried by a member 17 fixed to the upstanding members 11, 11 and bears against the inner end of the stabilizing bar as at 18.

Figure 3:
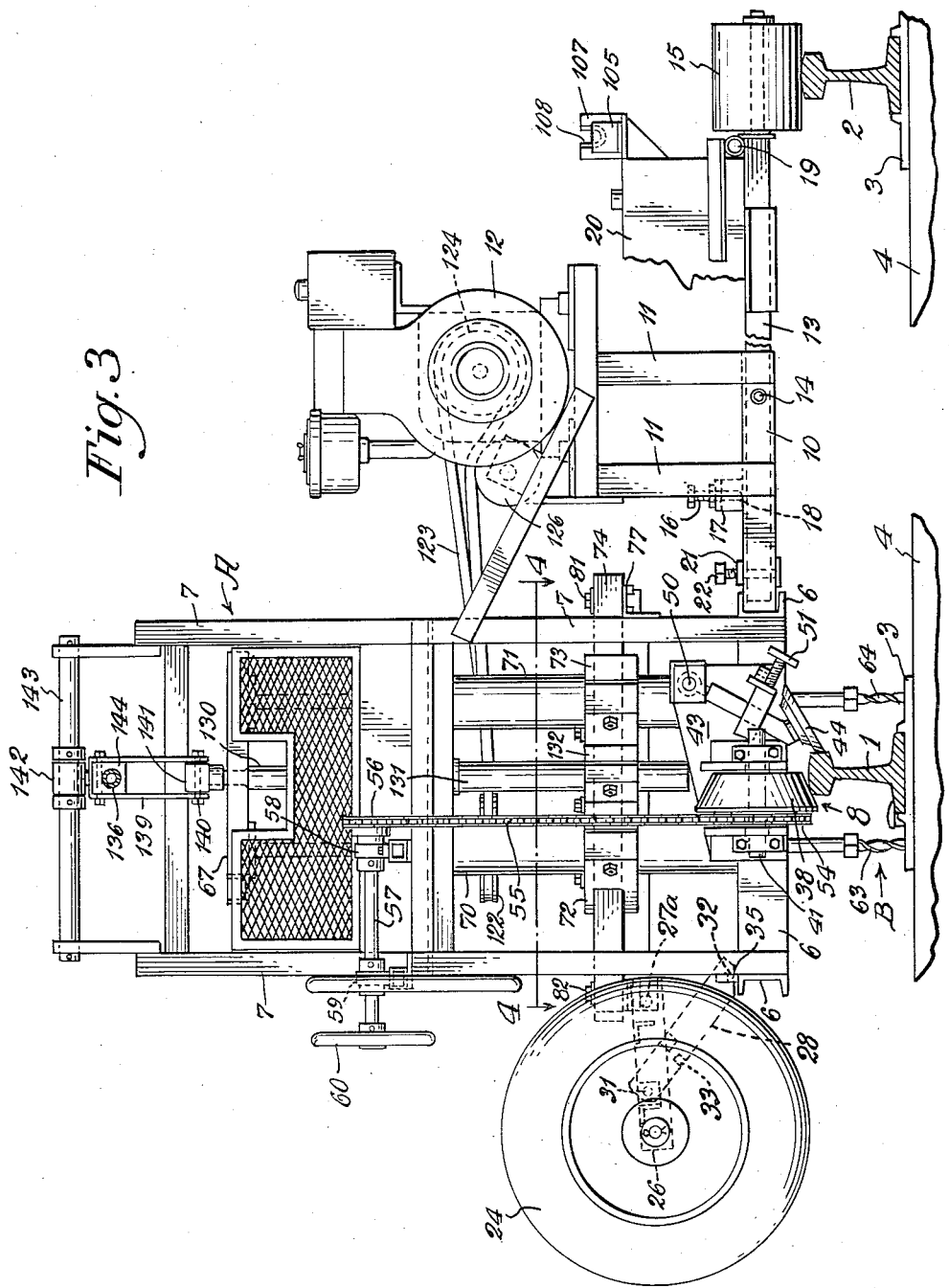
Figure 3 is an end elevational view looking longitudinally of the supporting rails of the machine shown in Figure 1.

A transversely extending member 21 engages the frame elements 10. The member 21 is adjustably mounted with respect to the inner end of the stabilizing bar as by means of the bolt 22, and limits the counterclockwise rotation of the stabilizing bar about the pivot 14, as shown in Figure 3. By adjusting the members 16 and 22, the stabilizing bar and frame may be tilted with relation to one another and thus the drilling assembly may be tilted into and out of a position normal or perpendicular to the track.

Any suitable handle 19 may be fixed to the outer end of the stabilizing bar 13 to enable the operator of the machine to raise and lower the outer end of the stabilizing bar. A tool box 20 is carried by the stabilizing bar 13 and serves as a counterweight to balance the machine.

Figure 5:
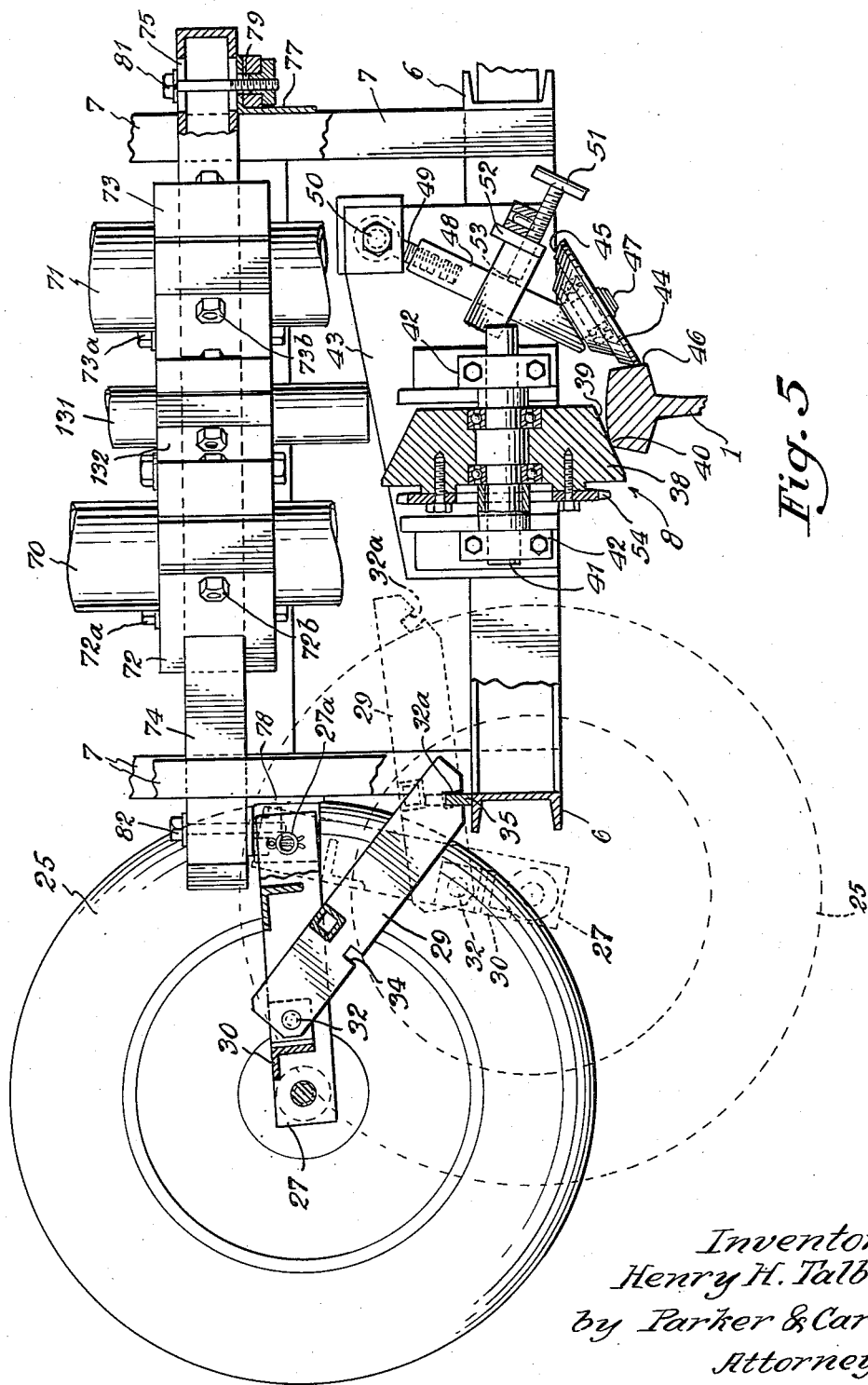
Figure 5 is a detail view of the supporting means for the machine shown in Figure 3, certain portions of the machine being shown in section for purposes of clarity.

In order to remove the machine from the track rails, a pair of run-off wheels 24, 25 are mounted on the left-hand side of the machine, as seen in Figure 3. The wheels 24 and 25 are mounted on a supporting structure formed by outwardly extending frame members 26 and 27. The members 26 and 27 are mounted for rotation about an axis 27 extending longitudinally of the machine. A pair of locking elements 28 and 29 are pivoted to a member 30 extending between the supports 26 and 27, as at 31 and 32. Each of the locking elements 28 and 29 have a first recess 32 and 32a at the ends of the members 28 and 29 and a second recess intermediate the ends, as at 33 and 34. Each of these recesses is adapted to receive an upstanding longitudinally extending member 35. When the recesses 32 and 32a are engaged with the projection 35, as shown in Figures 3 and 5, the run-off wheels 24 and 25 will be held in an upper, normally inoperative position. Whenever it is desired to remove the machine from the track rails, the locking elements 28 and 29 are lifted upwardly, thereby freeing the recesses 32 and 32a from the projection 35 and the wheels 24 and 25 will drop to the lower position shown in dotted outline in Figure 5. At this position, the recesses 34 and 34a engage the projection 35 and hold the wheels in their lower operative position. At this lower position, the wheels are disposed closely adjacent to or in contact with the rail bed extending alongside the rail 1 and the operator may grasp the handle 19 and tilt the machine upwardly generally about the axis of the wheels 24 and 25 and roll the machine to any desired location. When it is desired to re-position the machine over the track rails, the operator simply moves the machine over the track rails where the roller 15 and roller assemblies 8 are disposed above the track rails 1 and 2 and the machine is allowed to settle on the rails. The locking elements 28 and 29 are then disengaged and the wheels 24 and 25 are swung to their upper inoperative position, shown in Figures 1, 2, 3 and 5.

Figure 4:
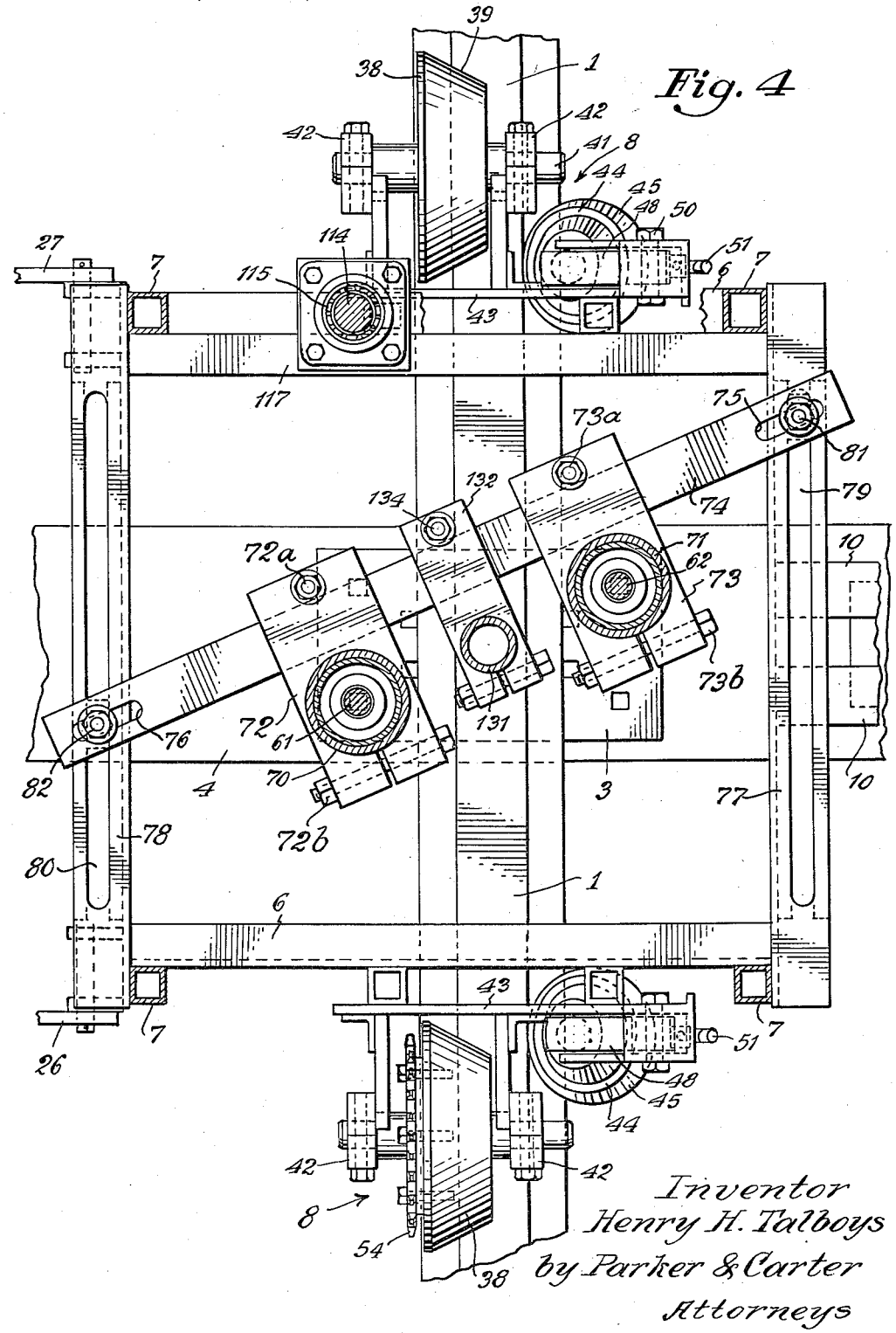
Figure 4 is a sectional view of the machine shown in Figure 3 looking along the section lines 4—4 of Figure 3.

A supporting roller assembly 8 is provided for the machine at longitudinally spaced points on the machine, as shown most clearly in Figure 4. Each assembly includes a generally frusto-conically shaped first roller 38 having the conic surface 39 thereof engageable normally with one upper corner 40 of the rail 1. Each roller 38 is mounted for rotation about a generally fixed shaft 41 supported by brackets 42, in turn carried by a frame member 43. Each assembly includes a second roller 44 having the surface 45 thereof adapted for contact with the opposite side 46 of the head of the rail 1. Each roller 44 is mounted for rotation about a journal 47 carried by a depending member 48. The member 48 is pivotally mounted upon the frame member 43, as by means of an adjustable eye bolt 49, which is pivoted on a pivot pin 50. The effective distance of the roller 44 from the pivot pin 50 may be varied by removing the pivot pin 50, and turning the eye bolt 49 with relation to the member 48.

For example, this may be necessitated by variations in the size of the rail with which the unit is used.

An adjusting setscrew 51 is carried by a frame member 52 on the frame member 43. The setscrew 51 has an inner end portion 53 bearing against the supporting member 48. By turning the setscrew 51, the angular position of the roller 44 with respect to the pivot pin 50 may be varied. If the setscrew 51 is rotated so as to force the supporting member 48 in a clockwise direction, as seen in Figure 5 for example, the machine and the roller 38 will be moved to the right. Conversely, opposite adjustment of the setscrew 51 will allow counterclockwise rotation of the supporting member 48 and results in the machine and roller 38 moving to the left, as seen in Figure 5. Thus the operator may adjust the position of the machine laterally of the track rails by adjusting the roller 44. The adjustments are made with direct relation to the rail 1, rather than the normally fixed rail 2.

The rear roller 38 has a sprocket 54 fixed to the outer face thereof. A chain 55 is engaged with the sprocket 54 and passes upwardly to a sprocket 56 mounted for rotation with a shaft 57 supported by any suitable bearings 58 and 59 on the upper portion of the frame. Any suitable hand wheel 60 is fixed to the shaft 57. By rotating the hand wheel 60, the operator of the machine may propel the machine along the track, and have positive control over the precise longitudinal position of the machine.

The drilling assembly 9 includes a pair of rotatable drill spindle shafts 61 and 62 adapted to straddle the rail 1 and rotate the drill bits 63 and 64 for drilling spike receiving holes in the supporting ties of the track. Each of the drill spindle shafts 61 and 62 is rotatably mounted in a thrust collar 65 and 66, respectively, slidably mounted in a thrust bracket 67. As will be seen most clearly in Figure 8, each of the drill spindle shafts is splined and is engaged by a splined member or shaft 68 and 69, respectively. Each of the splined members 68 and 69 are rotatably mounted in the upper end portion of housings 70 and 71 respectively. Each of the housings 70 and 71 are adjustably received by split clamps 72 and 73 respectively. Each clamp is adjustably mounted on a supporting bar 74. Each of the clamps 72 and 73 are illustrated in the form of blocks having slots communicating with the openings which receive the housings 70 and 71 and the supporting bar. The housings 70 and 71 and the support bar 74 are secured in their desired relative position by the tightening bolts 72a, 72b, 73a and 73b respectively associated with the clamps.

The opposite end portions of the supporting bar 74 are formed with slots 75 and 76. The supporting bar 74 rests upon longitudinally extending frame members 77 and 78, each of these members having generally longitudinally extending slots 79 and 80 respectively formed therein. Any suitable securing means, such as the bolt and nut 81, is passed through the slots 75 and 79. A similar securing means 82 is provided for the slots 76 and 80. By loosening the securing means, the supporting bars 74 may be moved to a wide variety of selected positions transversely of the rail 1 and secured with relation to the rail 1 and frame members 77 and 78. Furthermore, when the securing means are loosened, the supporting bar 74 may be moved axially to accommodate the drill bits 63 and 64 to any selected set of diagonally opposed holes in the tie plates 3.

Each of the spindle housing, spindle, drill bit and adapter assemblies are identical and for this reason only the assembly, including the housing 70 will be described. In Figure 8, for example, the lower portion of the spindle shaft 61 is rotatably mounted in bearings 83 and 84 carried by a sleeve 85 slidably mounted in the interior of the housing 70.

The lower portion 86 of the spindle shaft has a collar 87 slidably mounted thereon and biased to a normal lower position, as shown in Figure 8, by a spring 88. The lower portion of the spindle shaft has a bore 89 adapted to receive a drill bit adapter 90. The upper portion of the bore 89 terminates in a non-circular recess 91 conforming generally to the configuration of the tang 92 of an adapter shown in Figure 15. The collar 87 includes a second bore 93 at the lower portion thereof substantially larger than the diameter of the lower end portion of the shaft. A recess 94 is formed in the lower portion of the shaft and an adapter retaining ball 95 is seated in this recess. Whenever the collar 87 is raised to its uppermost position as shown in Figure 8, the enlarged bore 93 of the collar is generally aligned with the ball and the ball can move outwardly with respect to the shaft. When the collar is released, the spring 88 forces the collar 87 downwardly, and the collar forces the ball inwardly so as to force a portion of the ball into the bore in the spindle.

The tool box 20 is adapted to carry a plurality of adapters and drill bits to enable the operator of the machine to quickly change from one drill bit to another, as the occasion may require. For example, a member 97 may be provided in the tool box to hold a plurality of drill bits and a member 98 may be provided to hold a plurality of adapters for the drill bits. Each adapter 90 is generally elongated and includes a recessed portion 99 in the shank thereof adapted to receive the locking ball 95, when the shank is inserted into the lower end of the spindle shaft. A generally hexagonal portion 100 is formed on each adapter and is spaced from the tank 92 of the adapter in such a way as to be adjacent the lower end of the shaft when the tang 92 is received in the portion 91. Each adapter includes at its other end a generally elongated bore 101 adapted to receive the shank of a twist drill bit. The end portion of the adapter is tapered threaded, as at 102, and this end of the adapter is provided with longitudinally extending slots 103 cut through the wall of the adapter. A nut 104 which is internally pipe threaded or provided with internal tapered threads, is received by the threads 102. When a drill bit is inserted in the bore 101, the nut 104 is turned and the shank of the drill bit is tightly gripped by the adapter, the walls of the adapter bore being forced inwardly to effect the gripping action.

In order to insure that each assembled adapter and drill bit are of uniform length, the tool box is provided with a gauging device. The device includes a pair of upstanding positioning members 105 and 106 spaced apart on the order of the desired length of the assembled adapter and drill bit. An intermediate upstanding adapter guide member 107 is spaced from the member 105 a distance of the order of the distance of the tang to the hexagonal portion 100. The member 107 is cut away as will be seen in Figure 16 to conform to the shape of the hexagonal portion 100. A drill bit guide 108 is positioned intermediate the members 107 and 106 and serves to support the drill bit. Whenever the operator desires to change the drill bits, he simply places an adapter member from the tool box 20 into the position shown in Figure 15. A new drill bit is inserted in the bore 101 in the adapter and the assembled length of the adapter and drill bit are adjusted until the overall length conforms to the distance between the members 105 and 106. The drill bit 109 may be moved inwardly or outwardly with relation to the adapter by merely sliding the drill bit or the adapter or both along the guide recesses in the members 107 and 108. When properly positioned, the nut 104 is tightened. The member 107 prevents rotation of the adapter during the tightening process.

When the operator has assembled the bit and adapter, he merely slips the tang 92 of the adapter into the bore 89 of the shaft and moves the collar 87 to its uppermost position shown in Figure 8. The adapter moves into the bore of the shaft until the tang 92 is received in the portion 91. The operator then releases the collar 87 and the spring 88 forces the collar to its lowermost position where it forces the ball 95 into engagement with the recess 99, thus holding the adapter against displacement with relation to the shaft.

Figure 7:
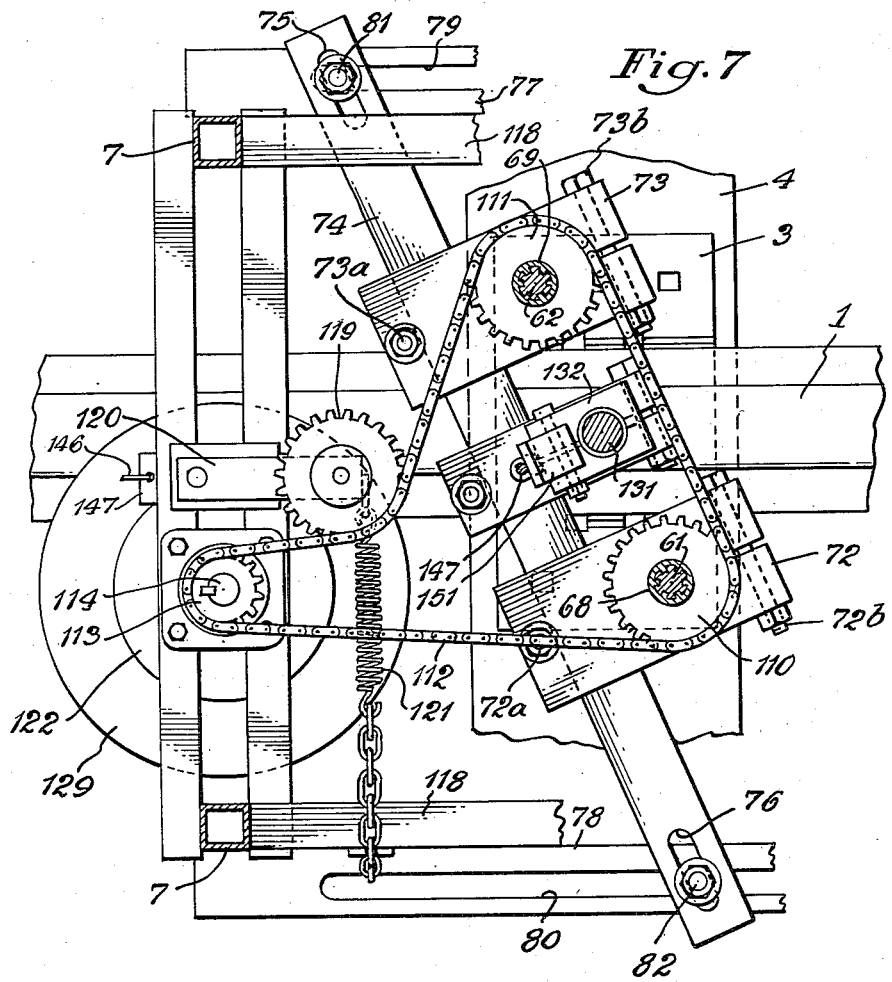
Figure 7 is a detail view of a portion of the driving means for the drilling assembly.

Each of the rotatable members 68 and 69 has a sprocket 110 and 111 respectively, affixed thereto. Each sprocket 110 and 111 is driven by a chain 112 (Figure 7), which is engaged by a sprocket 113 fixed to an upstanding shaft 114 rotatably supported by any suitable bearing assemblies 115 and 116 on frame members 117 and 118 respectively. An idler sprocket 119 is rotatably mounted upon a lever 120 pivoted to the frame. A spring 121 has one end portion fixed to the member 120 and another end portion adjustably fixed with respect to the frame and serves to bias the idler sprocket 119 into engagement with the chain 112, thereby taking up any slack in the chain 112.

A driven pulley 122 is fixed to the shaft 114. As will be seen in Figures 10 and 11, a belt 123 is passed about a driving pulley 124 on a shaft 125 of the prime mover and about the pulley 122. A pair of direction changing idler pulleys 126 and 127 are mounted on the frame to engage the belt 112.

Each of the idler pulleys 126 and 127 has a generally flat peripheral surface adapted for engagement with one strand of the belt 123. The axis of the pulley 126 is generally horizontal, as will be seen in Figure 11, and is positioned relatively close to the axis of the motor shaft 125. The pulley 126 serves to bring one strand 128 of the belt into the same general horizontal plane as the plane of the pulley 122. The idler pulley 127 has its axis inclined slightly to the vertical, as will be seen in Figure 11, and imparts a slight twist to the other strand as the strand passes in contact with the surface of the pulley 127.

A flywheel 129 is keyed to the shaft 114 and serves to store inertia delivered to the shaft 114 by the motor 12. The actual drilling time is but a small portion of the total running time of the motor 12 and the energy stored in the flywheel serves to maintain the speed of the drills relatively high during the drilling thrust.

A stabilizing shaft 130 has an upper end portion fixed to the thrust bracket 67. The shaft 130 is received in a sleeve 131 positioned in general parallelism with the housings 70 and 71. The lower end of the sleeve 131 is received by a clamping block 132, which is secured to the supporting bar 74. The clamping block 132 is similar in structural detail to the clamps 72 and 73. The stabilizing shaft 130, sleeve 131, thrust bracket 67, housings 70 and 71 and supporting bar 74 form a guiding structure to insure reciprocation of the spindles 61 and 62 in a true linear direction.

A handle and lever assembly (Figures 1 and 2) is provided for enabling the operator of the machine to reciprocate the drills. As will be seen best in Figure 2, a generally elongated lever 136 extends generally parallel to the track and has a handle portion 137 extending rearwardly of the machine and positioned generally above the rollers 38 and 44. Lever 136 is pivoted intermediate its ends as at 138 to a link 139 which is, in turn, pivoted as at 140 to a collar 141 secured to the upper end portion of the stabilizing shaft 130. A pivot member 142 is swingably mounted on a generally horizontally and transversely extending frame member 143. Pivot member 142 is joined to the lever 136 by any suitable connection 144. The end of the lever 136 opposite to the handle portion 137 is engaged by a spring 146 which is adjustably secured at one end thereof to a frame member 147. The spring 146 is tensioned to rock the handle portion 137 of the lever 136 upwardly about the pivot 142. The spring 146 has a biasing force sufficient to elevate the entire drilling assembly, including the thrust member 67, shafts 61 and 62 and drills 63 and 64. When the operator releases the handle 137, the spring 146 returns the handle and drills to an upper neutral position spaced a small distance upwardly from the tie plates 3.

The thrust bracket 67 has a stop rod 147 pivoted thereto as at 148. The stop rod 147 has a normal position which is generally vertical and in parallelism with the stabilizing shaft 130, as will be seen in Figure 12. The lower end of the stop rod 147 carries an abutment 149. The sleeve 131 has a projection 150 which is positioned to engage the upper surface of the abutment 149 when the spring 146 returns the drills and thrust bracket 67 to the upper neutral position. The projection 150 is preferably positioned on the sleeve 131 to limit the upward movement of the sleeve 136 and drills to a position where the lower ends of the drills are spaced slightly above the tie plates 3. This upper position of the tips of the drills is but a fraction of an inch above the tie plates 3. This positioning facilitates the longitudinal alignment of the drills with the spike holes. Since the tips of the drills are quite close to the tie plates in their normal or neutral position, it is comparatively easy to align the drill by merely sighting along the rail.

A second projection, which in this instance is shown as an angle bar 151, is positioned above the projection 150. The abutment 149 has a cut-away portion 152 to thereby form a ledge 153 engageable with the upper surface of the angle bar 151. Whenever it is desired to raise the drilling assembly to a position sufficiently high to clear a switch, crossing obstruction, the operator simply rotates the stop rod 147 out of engagement with the projection 150 and the spring 146 biases the drills and the stop rod 147 upwardly. The operator may aid this vertical movement by an upward thrust on the lever 136. The drills and the thrust brackets 67 are raised sufficiently high to allow the stop rod 147 to be swung inwardly or counterclockwise, as shown in Figure 12, to a position where the ledge 153 rests upon the upper surface of the angle bar 151, thereby holding the drilling assembly in an upper position. The upper projection is preferably positioned so as to hold the drills at an upper position well above the rail 1.

The upper surface of the projection 150 is inclined as at 154. Whenever it is desired to return the drilling assembly to the normal position, the operator grasps the upper portion of the stop rod 147 and swings it in a clockwise direction out of engagement with the angle bar 151 and forces the drilling assembly downwardly to a point where the abutment 149 may engage the projection 150. During such downward movement, the abutment 149 rides over the inclined portion 154.

Since the stop rod 147 is pivoted near its upper end, it seeks a normal vertical position, or a position in general parallelism with the stabilizing shaft 130 in engagement with the projection 150 or 151. The operator need not hold the stop rod out of its normal position when he desires to move the drills from their normal position to the upper extended position, or vice versa. A slight flick of the wrist of the operator will release the stop rod from either of its engaged positions. After release, the operator may move the assembly to the new position.

Whereas I have shown and described an operative form of my machine, I wish it to be understood that this showing is to be taken in an illustrative or diagrammatic sense only. There are many modifications of my invention which will be apparent to those skilled in the art and which are all within the scope of the invention. The scope of the invention, therefore, should be limited only as the hereinafter appended claims.

The use and operation of my invention are as follows:

The machine may be wheeled into any desired position along a track by means of the wheels 24 and 25. The machine is then positioned on the rails as shown in Figure 1. The drills 63 and 64 may be adjusted for drilling the holes for the rail spikes indicated at 155 in Figure 13 or the more widely spaced anchor spike holes indicated at 156 in Figure 13. As shown in Figure 3, the machine is positioned for drilling the anchor spike holes through the tie plates 3. Whenever the machine is adjusted transversely to the correct lateral position by means of the adjusting member 51, any undesired tilting of the drills out of a position normal to the plane of the ties may be compensated by means of the set-screws 16 and 22. When the drills are in their proper position for the drilling operation, the operator simply grasps the handle portion 137 and the hand wheel 60. By turning the hand wheel 60, the machine is moved along the rails from one tie plate to the other. The operator, while sighting along the rail 1 longitudinally of the rail, depresses the handle 137 and forces the drills into the ties. When the drills reach the lower limits of their movement, the operator relieves the handle on the downward thrust and the spring returns the drills to their upper position. The operator then rotates the hand wheel 60 and moves the machine to the next tie plate for the next drilling operation. Both the hand wheel 60 and the control handle 137 of the drills are positioned to be conveniently manipulated by the operator as he walks along and sights along the rail 1. If desired, the operator may push the machine from one position to the next and rely on the hand wheel 60 for any small adjustments longitudinally of the rail. During the drilling operation, the operator need sight or spot only one hole only longitudinally of the rail, the lateral position of the spike holes being spotted automatically by the pre-selected positioning of the drills.

If the operator desires to change the position of the drills from the anchor spike hole drilling position to the rail spike drilling position, it is comparatively easy and simple to adjust the housings 70 and 71 inwardly or outwardly, as the case may be, with respect to the supporting bar 74. The supporting bar 74 itself may be moved axially, in case it is desired to drill the oppositely disposed rail spike holes 155. The drills may be swung axially with respect to the rail in order to permit drilling of any pair of diagonally opposed spike holes in the tie plates.

Whenever it is desired to replace a worn drill with a new drill or a freshly sharpened drill, the operator simply thrusts upwardly on the collar 87 and pulls the adapter from within the spindle shaft 85. By loosening the nut 104, the drill bit 109 is released from the adapter. A new drill bit may then be positioned in the bore of the adapter and gauged to the proper dimension by means of the members 105 and 106 on the tool box. After gauging, the nut 104 is tightened and the adapter and drill bit are then reinserted in the lower end of the spindle shaft.

When the machine reaches an obstruction in the track, such as a switch or the like, the operator simply pulls inwardly on the upper end of the stop rod 147 and the drills are then raised to the upper extended position where the abutment 149 is positioned above the angle bar 151. The drilling assembly is then allowed to descend to a position where the ledge 153 of the abutment engages the angle bar 151. After clearing the obstruction, the operator simply releases the stop rod by again pulling inwardly on the upper portion of the stop rod sufficiently to release the ledge 153 on the angle bar 151 and the drilling assembly descends to its normal position.

When the drilling operations along the rail are finished, the locking elements for the wheels 24 and 25 are released and the wheels are allowed to descend into their lower position where the locking elements are again engaged. The operator of the machine may then grasp the handle 19 and tilt the machine about the axis of the wheels to a position where the roller assemblies 8 clear the rail. The machine may be wheeled from the track and may be rolled on to any carrying vehicle for the machine.

Whereas, no particular size of drill is critical, I find it advantageous to employ drills having a diameter somewhat less than the size of the rail spike.

I claim:

1. A tie drilling machine adapted to drill spike holes for a track rail positioned to gauge, including a frame movable along said rail and having supporting engagement with the other rail of a track, a reciprocal drilling assembly adapted to drill spike holes in said tie adjacent said positioned rail, means for adjusting said frame in a lateral direction to a fixed lateral position with respect to said track, said frame including means for tilting said frame and said drilling assembly relative to said track to insure reciprocation of said drilling assembly in a direction normal to the plane of the rails of said track.

2. A tie drilling machine for drilling holes in the rail-supporting ties of a track including a frame adapted for movement along said track, a drill spindle assembly mounted on said frame for vertical movement with respect to one rail of said track, said frame having a pair of wheels adapted for engagement with said one rail, a supporting roller extending from said frame and adapted for rolling contact with the other rail of said track, and an adjustable roller mounted on said frame for engagement with one side of said first-named rail, adjustment of said roller being effective to shift the said frame laterally of said track to thereby effect adjustment of said drill spindle assembly with relation to said track.

3. A tie drilling machine for drilling holes in the rail-supporting ties of a track including a frame adapted for movement along said track, a drill spindle assembly mounted on said frame for vertical movement with respect to one rail of said track, a pair of wheels on said frame adapted for engagement with said rail, a supporting roller extending from said frame and adapted for rolling contact with the other rail of said track, and an adjustable roller mounted on said frame for engagement with one side of said first-named rail, adjustment of said roller being effective to shift said frame laterally of said track to thereby effect adjustment of said drill spindle assembly with relation to said track, and hand-actuable means for rotating at least one of said flanged wheels to thereby propel said frame along said track.

4. A tie drilling machine adapted for simultaneous drilling of holes in a rail-supporting tie on opposite sides of a track rail including a wheel frame adapted for propulsion along the rails of a track, a pair of drill spindles mounted for vertical reciprocation with respect to one rail of a track, said spindles being spaced to straddle said rail of a track, said spindles being spaced to straddle said one rail therebetween, means for simultaneously depressing said spindles, a guide structure for said spindles, said guide structure being adjustably mounted on said frame for movement in a lateral direction with respect to said frame and movement in a longitudinal direction with respect to said frame, and means for holding said guide structure at a fixed position with respect to said frame.

5. A drill bit and adapter gauging structure including a support having a pair of upstanding positioning members spaced from one another a distance equal to the desired assembled length of an adapter and drill bit, an upstanding guide member intermediate said first-named upstanding members and having a recessed portion adapted for reception of an adapter, said support having a second upstanding guide member with a recessed portion adapted to receive a drill bit, said recessed portions and said positioning members being generally aligned thereby to allow relative sliding movement of a drill bit and adapter between said positioning members.

6. The structure of claim 5 characterized by and including a generally hexagonal recessed portion on said first-named guide member.

7. A drill bit and spindle assembly including a generally elongated spindle, a support, said spindle being rotatably mounted in said support, and having an end portion provided with a bore formed and adapted for the reception of an adapter, an adapter received within said bore and a drill bit carried by said adapter, said drill spindle having a locking element mounted for movement into and out of said bore, said adapter having a recessed portion for receiving said locking element, a collar slidably mounted on said spindle and adapted in one position thereof to engage said locking element thereby to force said locking element into engagement with said recess, and resilient means for forcing said collar into engagement with said locking element.

8. The structure of claim 7 characterized by and including stop means for limiting the movement of said collar with relation to said spindle.

9. The structure of claim 7 characterized by and including a reduced noncircular portion on said adapter engageable with a reduced noncircular portion of the bore within said spindle thereby to prevent relative rotation between said spindle and said adapter.

References Cited in the file of this patent

UNITED STATES PATENTS

| | | |
|---|---|---|
| 105,984 | Sanford | Aug. 2, 1870 |
| 238,079 | Beaumont | Feb. 22, 1881 |
| 301,978 | Fretel | July 15, 1884 |
| 608,110 | Dunlop | July 26, 1898 |
| 911,639 | Andrew | Feb. 9, 1909 |
| 915,184 | Kevin | Mar. 16, 1909 |
| 1,060,173 | Edwards | Apr. 29, 1913 |
| 1,098,751 | Newton | June 2, 1914 |
| 1,186,173 | Dixon | June 6, 1916 |
| 1,323,967 | Dickinson | Dec. 2, 1919 |
| 1,449,361 | Wink | Mar. 20, 1923 |
| 1,978,513 | Talborys | Oct. 30, 1934 |
| 1,995,168 | Bronander | Mar. 19, 1935 |
| 2,207,883 | Woolery | July 16, 1940 |
| 2,354,095 | Adams | July 18, 1944 |
| 2,380,049 | Jones | July 10, 1945 |
| 2,410,508 | Lamme | Nov. 5, 1946 |
| 2,487,572 | McKee | Nov. 8, 1949 |